(12) United States Patent
Bradford et al.

(10) Patent No.: US 12,715,778 B2
(45) Date of Patent: Aug. 25, 2026

(54) METHOD FOR PRODUCING HIGHB PURITY ALUMINUM FROM ALUMINUM CHLORIDE

(71) Applicant: ALUMINUM TECHNOLOGIES, LLC, New Orleans, LA (US)

(72) Inventors: Donald Ray Bradford, Lebanon, OR (US); Larry George Boxall, Simpsonville, SC (US); Charles Ernest Toth, Tylertown, TX (US); Charles Ernest Toth, III, Jefferson, LA (US); Caroline Toth Reily, Metairie, LA (US); Charles Toth, New Orleans, LA (US); Lester L. Knapp, New Orleans, LA (US)

(73) Assignee: ALUMINUM TECHNOLOGIES, LLC, New Orleans, LA (US)

( * ) Notice: Subject to any disclaimer, the term of this patent is extended or adjusted under 35 U.S.C. 154(b) by 0 days.

(21) Appl. No.: 18/763,678

(22) Filed: Jul. 3, 2024

(65) Prior Publication Data

US 2024/0351899 A1 Oct. 24, 2024

Related U.S. Application Data

(63) Continuation of application No. 17/950,491, filed on Sep. 22, 2022, now Pat. No. 12,515,961.

(Continued)

(51) Int. Cl.
*C25C 3/00* (2006.01)
*C01F 7/60* (2006.01)

(Continued)

(52) U.S. Cl.
CPC ................. *C01F 7/60* (2013.01); *C25C 3/06* (2013.01); *C25C 3/18* (2013.01); *C25C 3/22* (2013.01)

(58) Field of Classification Search
CPC ................ C25C 3/06; C25C 3/18; C25C 3/22
See application file for complete search history.

(56) References Cited

U.S. PATENT DOCUMENTS 2,959,528 A * 11/1960 De Varda ................. C25C 3/06 204/244
3,822,195 A 7/1974 Dell et al.

(Continued)

OTHER PUBLICATIONS

European Search Report Patent EP Application No. 24210290.3 dated Aug. 1, 2025 European Patent Office.

*Primary Examiner* — Zulmariam Mendez
(74) *Attorney, Agent, or Firm* — Spencer Fane, LLP

(57) ABSTRACT

A carbo-chlorination process is disclosed for selectively producing $AlCl_3$ from an alumina-containing feedstock, comprising introducing the following into a fluidized bed reactor maintained at 600-700° C.: (a) dried and calcined feed stream comprising the alumina-containing feedstock and a carbon feed; (b) chlorinating agent; (c) selectivity agent; (d) dried air; and optionally (e) off-spec $AlCl_3$. The process further includes removing a vapor stream from the reactor in which preferably about 75-80%, of the alumina present in the reactor is converted to $AlCl_3$; and also removing a solid raw pozzolan stream from the reactor, wherein about 90-99% of the silica present in the reactor remains unconverted and exits the reactor through the solid raw pozzolan stream. The vapor stream comprising $AlCl_3$ is purified to create an $AlCl_3$ product stream comprising preferably greater than about 99.99% $AlCl_3$. The raw pozzolan product is classified to remove coke and create a final pozzolan product having a strength activity index (SAI) in the range of 80-160, per ASTM 618.

9 Claims, 4 Drawing Sheets

Related U.S. Application Data

(60) Provisional application No. 63/248,024, filed on Sep. 24, 2021.

(51) Int. Cl.

| | |
|---|---|
| ***C25C 3/06*** | (2006.01) |
| ***C25C 3/18*** | (2006.01) |
| ***C25C 3/22*** | (2006.01) |

(56) References Cited

U.S. PATENT DOCUMENTS 4,083,923 A * 4/1978 Lippman .................. C01F 7/62 423/337
4,133,727 A * 1/1979 Rogers, Jr. ............. C25C 7/005 205/411

* cited by examiner 60
14
24
3
18
15
19
16
26
62
27
5
36
4
34
32
30
10
7
8
11
9
12
13
28
50
35

METHOD FOR PRODUCING HIGHB PURITY ALUMINUM FROM ALUMINUM CHLORIDE

CROSS-REFERENCE TO RELATED APPLICATION

This application is a continuation of U.S. patent application Ser. No. 17/950,491 filed Sep. 22, 2022, which claims the benefit of U.S. Prov. App. No. 63/248,024 filed Sep. 24, 2021.

BACKGROUND

The present invention relates to a process for the manufacture of pure metal chlorides, and more particularly relates to a process for manufacturing pure aluminum chloride ($AlCl_3$) from an alumina-containing feedstock.

The Hall-Héroult process is the major industrial process for producing aluminum. It involves dissolving aluminum oxide (alumina) in molten cryolite, and electrolyzing the molten salt bath, typically in a purpose-built cell. The Hall-Héroult process applied at industrial scale happens at 940-980° C. and produces 99.5-99.8% pure aluminum. With recent focus on global climate change, the Hall-Héroult process has been scrutinized for its environmental impacts, namely emissions of greenhouse gases in the electrolytic reaction (~1.2 billion MT $CO_2e$ in 2019), consumption of large amounts of electrical energy (906 TWh consumed in 2019), and the by-product manufacture of caustic "red mud" that must be impounded (175 million MT per year produced).

Alumina feedstock for the Hall-Héroult process is typically produced commercially by the Bayer process, which has been established as the principal industrial means of refining bauxite to alumina. Bauxite, historically the most favored commercial ore for producing aluminum, contains only 30-60% aluminum oxide. However, with a limited supply of smelter grade bauxite, and with bauxite occurring only in limited countries, lower quality raw materials (such as high-silica bauxite, kaolin clay, nepheline, ash) can be utilized as an alumina feedstock in the present invention. Kaolin clay, for example, typically consists of more than 50% silica and less than 40% aluminum oxide, and also contains oxides of iron, titanium, calcium, sodium, potassium, and magnesium.

Accordingly, much development has occurred through the years for a second process for producing aluminum metal, known as the Alcoa process. The Alcoa Smelting Process (ASP) produces aluminum metal by electrolyzing aluminum chloride produced by carbochlorinating any alumina-containing feedstock. ASP has been adapted to carbochlorinate lower quality alumina feedstocks. For instance, U.S. Pat. No. 4,695,436 described a process for the total chlorination of Kaolin clay and subsequent separation of valuable by-products, such as $AlCl_3$, $SiCl_4$, $FeCl_3$, and $TiCl_4$. Additionally, ASP avoided the ecological problems present with the Hall-Héroult process because the residues from the process of the current invention are dry and inert.

What is needed is an improved process for manufacturing aluminum having feed flexibility, reduced energy consumption, and with minimal negative impacts to the environment.

SUMMARY OF THE INVENTION

A carbo-chlorination process is disclosed for selectively producing $AlCl_3$ from an alumina-containing feedstock, comprising introducing the following into a fluidized bed reactor maintained at 600-700° C.: (a) dried and calcined feed stream comprising the alumina-containing feedstock and a carbon feed; (b) chlorinating agent; (c) selectivity agent; (d) dried air; and optionally (c) off-spec $AlCl_3$. The process further includes removing a vapor stream from the reactor comprising $AlCl_3$, wherein about 60-90%, preferably about 75-80%, of the alumina present in the reactor is converted to $AlCl_3$; and also removing a solid raw pozzolan stream from the reactor, wherein about 90-99% of the silica present in the reactor remains unconverted and exits the reactor through the solid raw pozzolan stream, and wherein greater than about 90% of the iron present in the reactor is converted to $FeCl_2$ and exits the reactor through the raw pozzolan product.

The selectivity agent is preferably selected from NaCl, KCl, LiCl, or any other species that form aluminum chloride complexes, and is added to the reactor at about 2-5% by mass to the alumina-containing feedstock. The chlorinating agent is preferably dry chlorine gas, and is added in an amount such that about 50-100% of the aluminum present in the reactor is chlorinated to $AlCl_3$. The carbon feed is preferably petroleum coke. The reactor is maintained at about 600-700° C. by controlling the flow of carbon feed and dried air.

In one embodiment of the present invention, the alumina-containing feedstock comprises kaolin clay that is calcined at approximately 750° C. for approximately one hour to substantially convert the kaolin clay to metakaolin ($Al_2O_3 \cdot 2SiO_2$) prior to the introducing step. For kaolin clay feed, the chlorinating agent is added such that 60-80% of the aluminum present in the reactor is chlorinated to $AlCl_3$. In another embodiment, the alumina-containing feedstock comprises bauxitic clay, for which the chlorinating agent is added such that about 75-90% of the aluminum present in the reactor is chlorinated to $AlCl_3$. In yet another embodiment, the alumina-containing feedstock comprises alumina trihydrate, for which the chlorinating agent is added such that about 90-100% of the aluminum present in the reactor is chlorinated to $AlCl_3$.

The vapor stream comprising $AlCl_3$ is purified to create an $AlCl_3$ product stream comprising preferably greater than about 99% $AlCl_3$, more preferably greater than about 99.9% $AlCl_3$, and most preferably greater than about 99.99% $AlCl_3$. The raw pozzolan product is classified to remove coke and create a final pozzolan product having a strength activity index (SAI) in the range of 80-160, per ASTM 618. The final pozzolan product comprises about 70-90 wt % $SiO_2$ and about 2-30 wt % $Al_2O_3$.

DETAILED DESCRIPTION OF THE INVENTION

A. $AlCl_3$ and Pozzolan Production

Figure 1:
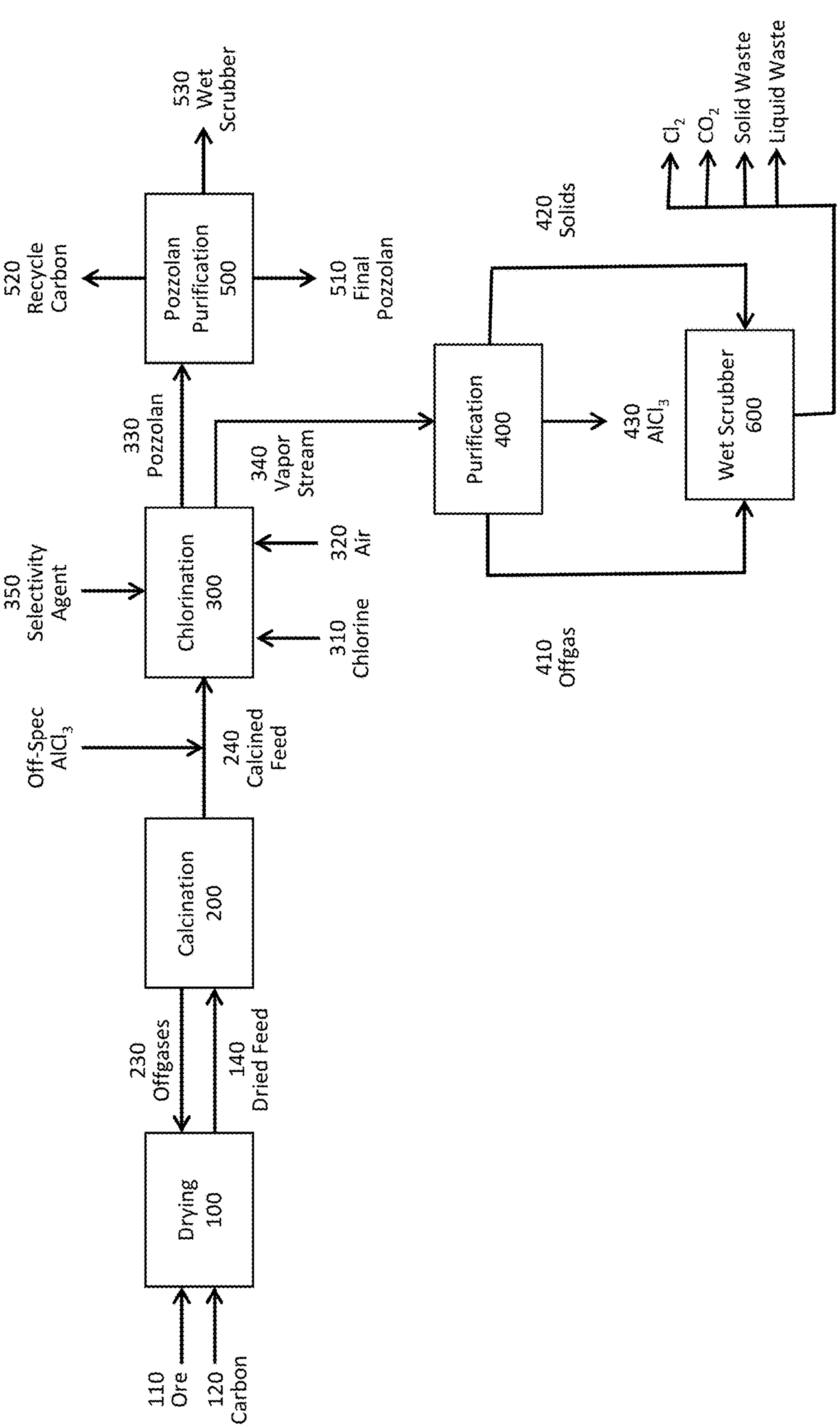
FIG. 1 is a block diagram illustrating the production and purification of $AlCl_3$ from an alumina-containing feedstock.

In a first embodiment of the present invention, a process is provided for making and purifying $AlCl_3$ from an alumina-containing feedstock, hereafter also referred to as an aluminous ore. In a second embodiment of the present invention, a process is provided for making a pozzolan product from an aluminous ore, wherein the pozzolan product has a strength activity index (SAI) in the range of 80-140, per ASTM 618. In a third embodiment of the present invention, a carbo-chlorination process is provided for selectively producing $AlCl_3$ from an alumina-containing feedstock, while minimizing production of $FeCl_3$ and $SiCl_4$. In a fourth embodiment of the present invention, a process is provided for making aluminum from $AlCl_3$. In a fifth embodiment of the present invention, a process is provided for making aluminum from an alumina-containing feedstock through an $AlCl_3$ intermediate product, wherein the process recovers and recycles chlorine such that the process in normal operation is a net supplier of chlorine. In a sixth embodiment of the present invention, a process is provided for making and purifying aluminum from an alumina-containing feedstock, wherein the process captures all greenhouse gases produced from carbon feedstock. In a seventh embodiment of the present invention, a bipolar reduction cell is provided, comprising non-consumable graphite plates and multiple anode/cathode reaction zones in each cell. In an eighth embodiment of the present invention, a process is provided for making and purifying aluminum from an alumina-containing feedstock, wherein the alumina-containing feedstock is kaolin clay available in geographic regions having carbon free energy options.

Aluminous ores usable in the present invention are any ores containing aluminum oxides that may be carbo-chlorinated to form $AlCl_3$. Non-limiting examples of such ores include kaolinitic, illitic, and other aluminum clays; bauxite, other bauxite clays; and other bauxite ores; siliceous bauxites and sillimanites; kyanites; aluminous shales, slates and fuel ashes; nepheline syenites; and anorthosite. Alumina trihydrates ($Al(OH)_3$) resulting from a variety of chemical processes, such as the Bayer process, may also be chlorinated according to the teachings of the present invention to form $AlCl_3$ A carbon source is required in the Chlorination Step 300 described below. The carbon source may be any carbon source known to a person of ordinary skill in the art, preferably one of a number of coal cokes or chars, including lignite, petroleum coke, and peat. Petroleum coke is the preferred carbon source, based on its high carbon content, availability, and relatively low price. The amount of carbon is specified in the process such that it results in an excess that is about 3 wt % to about 30 wt % in the operating bed (residue bed) in Chlorination Step 300. It has been recognized by the inventors that the chlorination rate rapidly decreases at excess carbon concentrations less than 3 wt %, and that excess carbon concentrations in excess of 30 wt % increases the loss of unreacted carbon, resulting in increased operating expense.

A preferred source of chlorine suitable for use in the present invention is $Cl_2$. However, other chlorine bearing materials such as $BCl_3$, $COCl_2$ and $CCl_4$ or mixtures thereof can be used. Preferably, the chlorine used is in the gaseous form.

With reference to FIG. 1, an exemplary process of the present invention is generally comprised of the following steps:

In the Drying Step 100, aluminous ore 110 and carbon source 120 are fed into a dryer where the free water in the ore and carbon source is removed by heating with off gases 230 from calcination step 200. The dried ore and carbon source are then directed to the calcination step 200 by stream 140 for the removal of chemically bound water from the ore. Alternatively, a person skilled in the art will understand that Drying Step 100 can be substituted with any other method known in the art for removing free water from aluminous ore 110 and/or carbon source 120.

In Calcination Step 200, temperatures in the range of 600-800° C., preferably in the range of 650-750° C., are utilized to remove the chemically bound water from the ore in a fluidized bed. The aluminous ore is preferably dried and removed of free water, and calcined to remove bound water to prevent objectionable hydrolysis of metal chlorides or the formation of corrosive hydrochloric acid. This step is accomplished by addition of heat provided by the burning of the dried carbon source in situ with air 220. It is preferred to carry out such calcining such that gamma-type alumina predominates, since this type of alumina is preferred because of its higher reactivity. As shown in FIG. 1, the off gases from calcination step 200 are directed along stream 230 back to drying step 100 to provide heat for drying step 100.

A specific temperature-residence time profile is utilized in Calcination Step 200 based on specific ore composition to help achieve selective chlorination of the ore, as will be discussed below in greater detail with respect to Chlorination Step 300. For example, with Kaolin clay feed, it is preferred that Calcination Step 200 occurs at approximately 750° C. for approximately one hour in order to substantially achieve the theoretical conversion of kaolin ($Al_2Si_2O_5(OH)_4$) to metakaolin ($Al_2O_3 \cdot 2SiO_2$). This is in stark contrast to prior art processes, which utilizes elevated temperatures as high as 900° C. for several hours to substantially achieve the theoretical conversion of kaolin to gibbsite ($\alpha$-$Al(OH)_3$).

In Chlorination Step 300, a chlorinating agent 310, such as dry chlorine gas (and/or a functionally equivalent chlorine compound), is combined with the calcined ore and carbon feed 240, any recycled off-spec $AlCl_3$ (optional), and a selectivity agent 350 in a fluidized bed reactor at 600-700° C., in order to provide selective chlorination of metal species, as discussed further below. Chlorine feed is specified such that 50-100%, of the aluminum present in the chlorinator is chlorinated to $AlCl_3$ based on the specific feedstock (e.g., 60-80% for kaolin clay feed, 75-90% for bauxite clay feed, 90-100% for pure alumina feed). Temperature of the refractory fluidized bed reactor is controlled by the flow of carbon feed (such as petroleum coke) and a small amount of dried ambient air 320, which results in the combustion of a fraction of the coke. The selectivity agent 350 is added at 2-5% by mass to the ore feed, and is preferably selected from NaCl, KCl, LiCl, or any other species that forms aluminum chloride complexes. In a preferred embodiment of the present invention, vapor stream 340, which consists primarily of specific metal chloride vapors discussed below, preferably exit the chlorinator through an internal cyclone, which removes the bulk of entrained solids, and is specified to operate at approximately 90% removal efficiency. Vapor stream is then directed to Purification Step 400. Solid pozzolan stream 330 is directed to Pozzolan Classifier Step 500.

Based on chosen operating temperature and pressure parameters, the reactions of the Chlorination Step 300 are controlled to selectively chlorinate certain metal species. In one preferred embodiment of the present invention, a typical calcined kaolin clay feed is chlorinated at 550-750° C., preferably 600-700° C., most preferably 640° C., to achieve the following:

(1) minimal liquid products formed within the chlorinator;
(2) 60-90%, preferably 75-80%, of the alumina present is converted to $AlCl_3$ and exits the chlorinator through vapor stream 340;
(3) the remainder of the alumina present is converted to $Al_2O_3$ or NaAlCl/$KAlCH_4$/$LiAlCl_4$, and exits the chlorinator through pozzolan stream 330;
(4) approximately 1-10%, preferably about 2%, of the silica present is converted to $SiCl_4$ and exits the chlorinator through vapor stream 340;
(5) the remainder of the silica present (approximately 90-99%) remains unconverted and exits the chlorinator through pozzolan stream 330;
(6) substantially all of the titanium present in the feed is converted to $TiCl_4$ and exits the chlorinator through vapor stream 340;
(7) approximately 90% of the iron present in the feed is converted to $FeCl_2$ and exits the chlorinator through pozzolan stream 330;
(8) the remainder of the iron present in the feed (approximately 10%) is converted to $FeCl_3$ and exits the chlorinator through vapor stream 340;
(9) substantially all of the sodium, potassium, or lithium present in the feed are converted to $NaAlCl_4$, $KAlCl_4$, $LiAlCl_4$, respectively, and exits the chlorinator primarily through pozzolan stream 330, with a small portion also through vapor stream 340; and
(10) substantially all of the magnesium and calcium present in the feed are converted to $MgCl_2$ and $CaCl_2$), respectively, and exits the chlorinator primarily through pozzolan stream 330, with a small portion also through vapor stream 340.

Similarly, chlorinating bauxitic clay feed at approximately 580° C. to 780° C., preferably 620° C. to 650° C., achieves the following:

(1) minimal liquid products formed within the chlorinator;
(2) 60-80%, preferably 80%, of the alumina present is converted to $AlCl_3$ and exits the chlorinator through vapor stream 340;
(3) the remainder of the alumina present (approximately 80-90%) remains unconverted or is converted to $NaAlCl_4$/$KAlCl_4$/$LiAlCl_4$, and exits the chlorinator through pozzolan stream 330;
(4) approximately 2% up to 5% of the silica present is converted to $SiCl_4$ and exits the chlorinator through vapor stream 340;
(5) the remainder of the silica present (approximately 95-98%) remains unconverted and exits the chlorinator through pozzolan stream 330;
(6) substantially all of the titanium present in the feed is converted to $TiCl_4$ and exits the chlorinator through vapor stream 340;
(7) approximately 90% of the iron present in the feed is converted to $FeCl_2$ and exits the chlorinator through pozzolan stream 330;
(8) the remainder of the iron present in the feed (approximately 10%) is converted to $FeCl_3$ and exits the chlorinator through vapor stream 340;
(9) substantially all of the sodium, potassium, or lithium present in the feed are converted to $NaAlCl_4$, $KAlCl_4$, $LiAlCl_4$, respectively, and exits the chlorinator primarily through pozzolan stream 330, with a small portion also through vapor stream 340; and
(10) substantially all of the magnesium and calcium present in the feed are converted to $MgCl_2$ and $CaCl_2$), respectively, and exits the chlorinator through pozzolan stream 330, with a small portion also through vapor stream 340.

As such, pozzolan stream 330 has the following exemplary composition ranges (wt %) for a high-quality white kaolin clay feed:

| | |
|---|---|
| $Al_2O_3$ | 10-20% |
| $NaAlCl_4$/$KAlCl_4$/$LiAlCl_4$ | 0-0.1% total |
| $SiO_2$ | 70-90% |
| $FeCl_2$ | 3-5% |
| $MgCl_2$/$CaCl_2$ | 1-5% |
| carbon | 3-10% |

As such, vapor stream 340 has the following exemplary composition ranges (wt %) for a high-quality white kaolin clay feed:

| | |
|---|---|
| $AlCl_3$ | 50-60% |
| $SiCl_4$ | 1-3% |
| $TiCl_4$ | 4-6% |
| $FeCl_3$ | 0.2-0.5% |
| $NaAlCl_4$/$KAlCl_4$/$LiAlCl_4$ | 5-10% total |
| CO and $CO_2$ | 18-30% |
| $Cl_2$ | <1% |

As understood by persons skilled in the art, relevant prior art chlorinator processes typically operated at 850-950° C., achieving maximum chlorination of all metal species present. By contrast, the present invention utilizes reduced temperature to selectively: (1) maintain 60-80% alumina conversion to $AlCl_3$ (for kaolin clay feed, for example, compared to 90+% conversion in the prior art); (2) minimize silicon conversion to $SiCl_4$ (compared to 90+% conversion in the prior art); and (3) restricting iron conversion to preferentially $FeCl_2$ over $FeCl_3$ (compared to 100% conversion to $FeCl_3$ in the prior art). As discussed in more detail below, these selective conversions significantly simplifies and improves $AlCl_3$ purification, and upgrades the solid residue stream 330 to a high pozzolan value stream.

In Pozzolan Classifier Step 500, pozzolan stream 330 is preferably classified to remove coke (and some absorbed chlorine-containing components such as $FeCl_2$, $MgCl_2$, $CaCl_2$), $NaAlCl_4$, $KAlCl_4$, and $LiAlCl_4$) using techniques well known in the art. Alternatively, the coke can be burned off using a calcining process. Carbon/chlorine recycle stream 520 is recovered and recycled to carbon source 120. Vented air 530 from the classifier is preferably scrubbed using techniques well known in the art. The pozzolan product may be washed to remove any remaining soluble chlorides, which are sent to waste disposal. Final pozzolan product 510, after further thermal treatment, is a high-value supplementary cementitious material (SCM) for replacing cement in concrete, comprising primarily $SiO_2$ (70-90 wt %) and $Al_2O_3$ (2-30 wt %). A person skilled in the art will understand that the quality of any pozzolanic material is expressed as strength activity index (SAI). Per ASTM 618, SAI is calculated based on 20% replacement of Portland Cement and the resulting SAI compared to the reference Portland Cement (SAI=100). The SAI for pozzolan product 510 is greater than 130, preferably between 135-140, which a person skilled in the art will appreciate indicates a superior cement substitute/replacement.

In Purification Step 400, a plurality of techniques are employed to remove impurities from vapor stream 340. In a preferred embodiment of the present invention, the following steps can be utilized:

(1) Vapor stream 340 exits the chlorinator in Chlorination Step 300 through a high efficiency external cyclone, which removes and discharges the bulk of entrained solids to pozzolan stream 330, and is specified to operate at approximately 90% removal efficiency.

(2) Methane is added to vapor stream 340 in a controlled amount (minimizing excess) to convert unreacted chlorine to form HCl and carbon, and to convert $FeCl_3$ to $FeCl_2$, HCl and carbon. Excess methane is minimized in order to minimize conversion of $AlCl_3$ to HCl, $Al_2O_3$, CO, and carbon. Water or another hydrogen-containing additive (not including HCl) may alternatively be used instead of methane.

(3) A primary filter containing sintered metal filter elements is operated at approximately 500° to collect >99% of 0.6 μm particles and 99.9% of >2 μm particles, which includes $FeCl_2$ and any other fines ($SiO_2$, $Al_2O_3$, and carbon). Filtered solids can be disposed of as waste, or added to pozzolan stream 330.

(4) A primary filter cooler then cools the filtered gas to approximately 320° C. in a shell-and-tube heat exchanger, using diphenyl-diphenyl oxide (DP:DPO) eutectic heat-transfer fluids as coolant, for example. An offgas knockout drum is utilized to remove condensed $NaAlCl_4$, $KAlCl_4$, and $LiAlCl_4$, which is disposed as waste.

(5) A secondary cooler then cools the gas to 200° C. in a shell-and-tube heat exchanger, using 100° C. boiler feed water, for example. A secondary filter then removes the remaining condensed $NaAlCl_4$, $KAlCl_4$, and $LiAlCl_4$, which is disposed as waste.

(6) An $AlCl_3$ condenser, preferably a fluidized bed desublimer with integral cyclone operating at approximately 80° C., condenses $AlCl_3$, which is removed and stored. Off-gases from the condenser, which include $SiCl_4$ and $TiCl_4$ in addition to CO, $CO_2$, HCl, and trace amounts of $AlCl_3$, are filtered to remove fines (that are returned to the condenser) and is directed to an offgas wet scrubber.

(7) In a preferred embodiment of the present invention, the chemical waste materials from the chlorination, purification and reduction processes are treated to recover a portion of their chemical value and render a reduced quantity of remaining materials suitable for industrial offsite disposal. The waste reactive metal chlorides (for example $AlCl_3$, $SiCl_4$, $TiCl_4$ $FeCl_3$, $NaAlCl_4$, etc.) are hydrolyzed with water in a conventional wet scrubber to form an HCl solution and their related non-reactive salts. The non-reactive salts are treated with a final neutralization, dechlorination with $H_2SO_4$ (or similar displacement materials), filtered, washed, dewatered, and dried as needed before final disposal. A portion of the filtered water is recycled within the waste treatment process to reduce the liquid disposal volume. The HCl solution is filtered and concentrated to provide a feed material for a commercial HCl to $Cl_2$ recovery process (electrochemical or catalytic). The recovered $Cl_2$ gas is filtered and dried before it is recycled to the chlorination process. Recovery of these chloride values as $Cl_2$ reduces the procurement of new makeup $Cl_2$ or in the case of an excess of onsite $Cl_2$, a marketable product for sale. $Cl_2$ is also recovered from the reduction cell off gas as described later in the reduction process section of this invention.

(8) Solid chloride containing waste materials from the purification steps are hydrolyzed with water in a conventional wet slurry reactor to form an HCl solution and their related non-reactive salts. The non-reactive slurry is treated with a final neutralization, dechlorination with $H_2SO_4$ (or similar displacement materials), filtered, washed, dewatered, and dried as needed before final disposal. A portion of the filtered water is recycled within the waste treatment process to recover chloride value. In a preferred embodiment of the present invention, the dry solids are treated in a displacement process (such as with heated $H_2SO_4$) to displace its chloride value as HCl gas leaving their related non-reactive salts (sulfate salt). The non-reactive salts are treated with a final neutralization, dechlorination with $H_2SO_4$ (or similar displacement materials), filtered, washed, dewatered, and dried as needed before final disposal. A portion of the filtered water is recycled within the waste treatment process to reduce the liquid disposal volume. The HCl gas is directed to the off gas wet scrubber.

In another embodiment of the present invention, the following steps can be utilized in Purification Step 400:

(1) Vapor stream 340 exits the chlorinator in Chlorination Step 300 through a high efficiency external cyclone, which removes and discharges the bulk of entrained solids to pozzolan stream 330 and is specified to operate at approximately 90% removal efficiency.

(2) Methane is added to vapor stream 340 in a controlled amount (minimizing excess) to convert unreacted chlorine to form HCl and carbon, and to convert $FeCl_3$ to $FeCl_2$, HCl and carbon. Excess methane is minimized to minimize conversion of $AlCl_3$ to HCl, $Al_2O_3$, $CO_2$, CO and carbon. Water or another hydrogen-containing additive (not including HCl) may alternatively be used instead of water.

(3) A primary fluid bed cooler/filter is used to cool the filtered gas to approximately 320° C. A fluidized bed desublimer with integral cyclone operating at approximately 320° C., condenses most of the $NaAlCl_4$, $KAlCl_4$, and other condensable salt vapors which are collected in the solid particulate fluid bed material. This bed material is primarily made up a residue material discharged from the chlorinator or other inert particulate material such as alumina or sand. A portion of the bed material from this fluid bed cooler/filter is withdrawn as waste material to control the concentration of condensed/filtered gas materials in the working fluid bed. These enriched $NaAlCl_4$, $KAlCl_4$ waste materials in stream 420 are then processed in the waste scrubber system to recover their chlorine value or sold to a third party.

(4) If necessary, additional methane is added to vapor from the primary fluid bed cooler/filter in a controlled amount (minimizing excess) to convert residual unreacted chlorine to form HCl and carbon, and to convert $FeCl_3$ to $FeCl_2$, HCl and carbon. Excess methane is minimized to minimize conversion of $AlCl_3$ to HCl, $Al_2O_3$, $CO_2$, CO and carbon. Water or another hydrogen-containing additive (not including HCl) may alternatively be used instead of water.

(5) A secondary fluid bed cooler/filter is used to cool the filtered gas to approximately 200° C. The fluidized bed desublimer with integral cyclone operating at approximately 200° C., condenses any residual $NaAlCl_4$, $KAlCl_4$, and other condensable salt vapors and other solids which are collected in the solid particulate fluid bed material. This bed material is primarily made up a residue material discharged from the chlorinator or other inert particulate material such as alumina or sand. A portion of the bed material from this fluid bed cooler/filter is withdrawn as waste material to control the concentration of condensed/filtered gas materials in the working fluid bed. These enriched $NaAlCl_4$ and $KAlCl_4$ waste materials in stream 420 are then processed in the waste scrubber system to recover their chlorine value or sold to a third party.

(6) A secondary filter containing sintered metal filter elements is operated at approximately 200° C. to collect >99% of 0.6 μm particles and 99.9% of >2 μm particles from the cooled/filtered gas from the secondary fluid bed cooled/filter. Filtered solids can be disposed of as waste, or added to pozzolan stream 330.

(7) An $AlCl_3$ condenser, preferably a fluidized bed desublimer with integral cyclone operating at approximately 80° C., condenses $AlCl_3$, which is removed and stored 430. Off-gases in stream 410 from this condenser, which include $SiCl_4$ and $TiCl_4$ in addition to CO, $CO_2$, HCl, and trace amounts of $AlCl_3$, are filtered to remove fines (that are returned to the condenser) and are directed to an offgas stream 410 to the wet scrubber.

In yet another embodiment of the present invention, the following steps can be utilized in Purification Step 400:

(1) Vapor stream 340 exits the chlorinator in Chlorination Step 300 through a high efficiency external cyclone, which removes and discharges the bulk of entrained solids to pozzolan stream 330 and is specified to operate at approximately 90% removal efficiency.

(2) Methane is added to vapor stream 340 in a controlled amount (minimizing excess) to convert unreacted chlorine to form HCl and carbon, and to convert $FeCl_3$ to $FeCl_2$, HCl and carbon. Excess methane is minimized to minimize conversion of $AlCl_3$ to HCl, $Al_2O_3$, $CO_2$, CO, and carbon. Water or another hydrogen-containing additive (not including HCl) may alternatively be used instead of water.

(3) A primary gas cooler is used to cool the filtered gas to approximately 320° C. Conventional commercial U-Tube and cold finger heat exchanger designs (or equivalent) are preferably used to facilitate efficient cooling of gas mixtures that contain solid particles, condensable fluids that form liquids and solids, and non-condensable gases. The vertical orientation and spacing of the cooling surfaces facilitate liquid drainage. Separate bundles of cooling surfaces/tubes are preferably provided so that intermittent replacement of the cooling fluid with a heating fluid to melt/sublime liquid/solid scaling of the heat exchanger surfaces. U-Tubes preferably allow tubes to expand and contract freely to prevent damage and stress during startup, cleaning and shut down operations. Removable tube bundles make replacement and remote cleaning quick and easy. The heat exchanger operating at approximately 320° C., condenses most of the $NaAlCl_4$, $KAlCl_4$, and other condensable salt liquids in the gas stream, which then drain off the heat exchanger surfaces. Solid materials from the gas stream and solids spalled off the heat exchanger surfaces during the periodic heat cycle are removed by gravity and the gas velocity through the cooling unit. Carbon dusting can be formed according to the Boudouard reaction when the off gas is cooled ($CO_2$+C=2 CO).

(4) A knockout drum or similar demisting device is used to separate the liquids and solids discharged from the primary gas cooler. The liquid/solid materials are withdrawn from the separation device and then preferably cooled below 80° C. (below the sublimation temperature of $AlCl_3$) before this material is discharged to the chlorinator discharge residue or the waste treatment system to recover the contained chlorides as recycled $Cl_2$. These enriched $NaAlCl_4$ and $KAlCl_4$ waste materials are processed in the waste scrubber system to recover their chlorine value or sold to a third party.

(5) If necessary, additional methane is added to vapor from the primary gas cooler in a controlled amount (minimizing excess) to convert residual unreacted chlorine to form HCl and carbon, and to convert $FeCl_3$ to $FeCl_2$, HCl and carbon. Excess methane is minimized to minimize conversion of $AlCl_3$ to HCl, $Al_2O_3$, $CO_2$, CO and carbon. Water or another hydrogen-containing additive (not including HCl) may alternatively be used instead of water.

(6) A secondary gas cooler is used to cool the process gas to approximately 200° C. This condenses any residual $NaAlCl_4$, $KAlCl_4$, and other condensable salt vapors and other solids that are collected in the solid particulate fluid bed material. This gas cooler may be the same as or similar to the primary gas cooler. The heat removal load, condensable fluids and solids loading are significantly less than that in the primary gas cooler. The non-condensable gas mass flow is similar to that in the primary gas cooler. Process efficiency is maximized to maximize the final $AlCl_3$ product purity.

(7) A secondary filter containing sintered metal filter elements is operated at approximately 200° C. to collect >99% of 0.6 μm particles and 99.9% of >2 μm particles from the cooled/filtered gas from the secondary fluid bed cooled/filter. Filtered solids can be disposed of as waste or added to pozzolan stream 330. The secondary filter may comprise a knockout drum, demister, bag filter or sintered metal filter elements.

(8) An $AlCl_3$ condenser, preferably a fluidized bed desublimer with integral cyclone operating at approximately 80° C., condenses $AlCl_3$, which is removed and stored. Off-gases from this condenser, which include $SiCl_4$ and $TiCl_4$ in addition to CO, $CO_2$, HCl, and trace amounts of $AlCl_3$, are filtered to remove fines (that are returned to the condenser) and then directed to an off gas wet scrubber.

In another embodiment of the present invention, the following steps can be utilized in Purification Step 400:

(1) Vapor stream 340 exits the chlorinator in Chlorination Step 300 through a high efficiency external cyclone, which removes and discharges the bulk of entrained solids to pozzolan stream 330 and is specified to operate at approximately 90% removal efficiency.

(2) Methane is added to vapor stream 340 in a controlled amount (minimizing excess) to convert unreacted chlorine to form HCl and carbon, and to convert $FeCl_3$ to $FeCl_2$, HCl and carbon. Excess methane is minimized to minimize conversion of $AlCl_3$ to HCl, $Al_2O_3$, $CO_2$, CO and carbon. Water or another hydrogen-containing additive (not including HCl) may alternatively be used instead of water.

(3) A primary fluid bed cooler/filter is used to cool the filtered gas to approximately 250° C. A fluidized bed desublimer with integral cyclone operating at approximately 250° C. condenses the $NaAlCl_4$, $KAlCl_4$, and other condensable salt vapors which are collected in the solid particulate fluid bed material. This bed material is primarily made up a residue material discharged from the chlorinator or other inert particulate material such as alumina or sand. A portion of the bed material from this fluid bed cooler/filter is withdrawn as waste material to control the concentration of condensed/filtered gas materials in the working fluid bed. These enriched $NaAlCl_4$, $KAlCl_4$ waste materials in stream 420 are then processed in the waste scrubber system to recover their chlorine value or sold to a third party. Conventional commercial U-Tube and cold figure heat exchanger designs or equivalent are used to facilitate:

Efficient cooling of the fluid bed that contain solid particles, condensable fluids that form liquids and solids, and non-condensable gases.

Vertical orientation and spacing of the cooling surfaces to facilitate liquid drainage.

Separate bundles of cooling surfaces/tubes are provided so that intermittent replacement of the cooling fluid with to a heating fluid to melt/sublime liquid/solid scaling of the heat exchanger surfaces.

U-Tubes allow tubes to expand and contract freely to prevent damage and stress during startup, cleaning and shut down operations.

Removable tube bundles make replacement and remote cleaning quick and easy.

Low capital and maintenance costs a low-cost reliable process operation.

In Wet Scrubber Step 600, a plurality of techniques may be employed to remove impurities and recover the $Cl_2$ value from the process off gases and solid waste discharges. The chemical waste materials from the chlorination (streams 410 and 420), purification (stream 410) and reduction processes (stream 620) are preferably treated to recover a portion of their chemical value and render a reduced quantity of remaining materials suitable for industrial offsite disposal. In a preferred embodiment of the present invention, the following steps can be utilized:

(1) The waste reactive metal chlorides vapors in stream 410 (for example $AlCl_3$, $SiCl_4$, $TiCl_4$ $FeCl_3$, $NaAlCl_4$, etc.) are hydrolyzed with water in a conventional wet scrubber to form an HCl solution and their related non-reactive salts.

(2) The non-reactive waste gases in stream 410 (for example $CO_2$, CO $N_2$, etc.) gases are scrubbed and discharged as a concentrated wet stream of primarily $CO_2$ for subsequent $CO_2$ beneficiation for feed to third party processes producing dry $CO_2$ gas, liquid $CO_2$ or solid $CO_2$.

(3) The non-reactive chloride salt wastes in stream 420 (for example $CaCl_2$), $MgCl_2$ $FeCl_2$, NaCl, KCl, etc.) are also added to the aqueous scrubber liquid in the wet scrubber.

(4) The liquid and solids (dissolved and slurry) discharged from the wet scrubber are then reacted by a $H_2SO_4$ displacement process to maximize the dissolved HCl content. The HCl solution is filtered and concentrated (such as HCl Membrane Distillation Separation) to provide a feed material for a commercial HCl to $Cl_2$ recovery process (electrochemical or catalytic).

(5) The final liquid/solids discharge treated with a final neutralization, dechlorination with $NaHSO_3$ (or similar materials such as $Na_2SO_3$, $Na_2S_2O_3$, $SO_2$), filtered, washed, dewatered, and dried as needed before final disposal. A portion of the filtered water is recycled within the waste treatment process to reduce the liquid disposal volume.

(6) The recovered $Cl_2$ gas is filtered and dried before it is recycled to the chlorination process. Recovery of these chloride values as $Cl_2$ reduces the procurement of new makeup $Cl_2$ or in the case of an excess of onsite $Cl_2$, a marketable product for sale. $Cl_2$ is also recovered from the reduction cell off gas as described later in the reduction process section of this invention.

The $AlCl_3$ in the purified gas stream is condensed to produce granular solid $AlCl_3$ with the remaining non-condensable gases comprising $SiCl_4$, $TiCl_4$, $CO_2$, CO, HCl and $N_2$ discharged to the wet scrubber system. The basic principle of this condenser is introducing the hot gas stream from the chlorinator into a fluid bed of aluminum chloride far enough from any solid surfaces so that no chloride condenses and sticks to the surface. A portion of the filtered condenser off gas is recirculated back to the fluidizing gas inlet for the fluid bed reactor. Heat exchanger tube/devices are in the fluid bed to maintain the fluid bed of $AlCl_3$ at its desired operating temperature. The sublimation temperature of the $AlCl_3$ at 1 atmosphere pressure is ~178° C. and a proposed 80° C. as the operating fluid bed temperature.

Conventional heat exchanger plates, U-tubes and cold fingers may be used to cool the fluid bed. Individual bundles of U-tube and cold finger heat exchanger units provide a convenient low maintenance option to use intermittent short heating cycles to clean any condensate fouling of their operation.

Plant scale tests indicate that a minimum 2 ft separation is used as the separation distance from the hot gas injection points to the closest heat exchanging surface to ensure there is minimal condensation that would degrade the heat exchange efficiency. The fluidizing gas velocity is sufficient to ensure a uniform fluid bed operating temperature between the gas injection points and the heat exchanger devices and exterior wall surfaces.

An internal cyclone may alternatively be used to supplement the dust disengagement section above the fluid bed. Fine materials separated by external bag house filters are returned to the fluid bed for further condensation growth. An auger or similar solids with drawl system is used to maintain a constant fluid bed depth and $AlCl_3$ granular transport to the product testing and storage silos.

For a person skilled in the art, the selection of the various waste treatment components can be selected to best satisfy the plant operating and environmental strategies.

B. Aluminum Production and Reduction Cell Design

In yet another embodiment of the present invention is an apparatus and process for producing metal such as aluminum from the metal chloride dissolved in a molten solvent, by electrolyzing the chloride-solvent bath in a cell which includes an anode, at least one intermediate bipolar electrode, and a cathode in superimposed spaced relationship defining interelectrode spaces, with selectively directed bath flow through the inter-electrode spaces. While the invention may be employed for producing other metals, such as magnesium, zinc or lead, it is particularly applicable to producing aluminum.

By way of background, the commercial production of aluminum occurs by electrolyzing a bath of alumina dissolved in a molten fluoride salt bath composed essentially of sodium fluoride, aluminum fluoride and calcium fluoride. In this process, commonly known as the Hall-Heroult process, carbon anodes are employed which are gradually consumed by the oxygen produced on the anode surfaces. The bath is maintained at temperatures over 900° C.

Other prior art and apparatus and processes were developed, such as is described by U.S. Pat. No. 3,893,899, directed to the use of aluminum chloride as the source material for aluminous metal. It is well known that the electrolytic reduction of aluminum chloride provides two inherent improvements over the Hall-Heroult process: (1) it does not produce oxygen that consumes the carbon anode surfaces; and (2) it may be electrolyzed at appreciably lower temperatures than alumina (900° C.). Although the possibilities of achieving these and other advantages attendant the use of aluminum chloride as a source material in the electrolytic reduction of aluminum have long been recognized and avidly sought, commercial realization thereof has been precluded by numerous other unsolved problems.

The present invention relates to a commercially viable process and apparatus for the electrolytic production of aluminum from aluminum chloride in a cell which includes an anode, at least one intermediate bipolar electrode, and a cathode in superimposed, spaced relationship defining inter-electrode spaces therebetween. The process comprises an electrolyzing bath composed essentially of aluminum chloride dissolved in molten solvent of higher decomposition potential in each inter-electrode space to produce chlorine on each anode surface thereof and metal on each cathode surface thereof, and establishing and maintaining a flow of bath through each inter-electrode space to effect removal therefrom of produced aluminum. This bath flow is such that it sweeps aluminum therewith out of each inter-electrode space. Desirably the bath flow is selectively directed into, across and out of each inter-electrode space, by utilization of the chlorine produced as the lifting gas in a gas lift pump which lifts the lighter bath upwardly while permitting heavier molten aluminum swept from each inter-electrode space to settle in a direction counter to that of the chlorine-pumped bath. In the practice of such process, additional aluminum chloride may be incrementally or continuously fed into the bath, and the bath as so maintained may be continuously recycled through the inter-electrode spaces. Still other aspects of the invention include novel structure and structural inter-relationships for the cell and electrode components to complement and enhance the operational efficiency of the process described.

Figure 3:
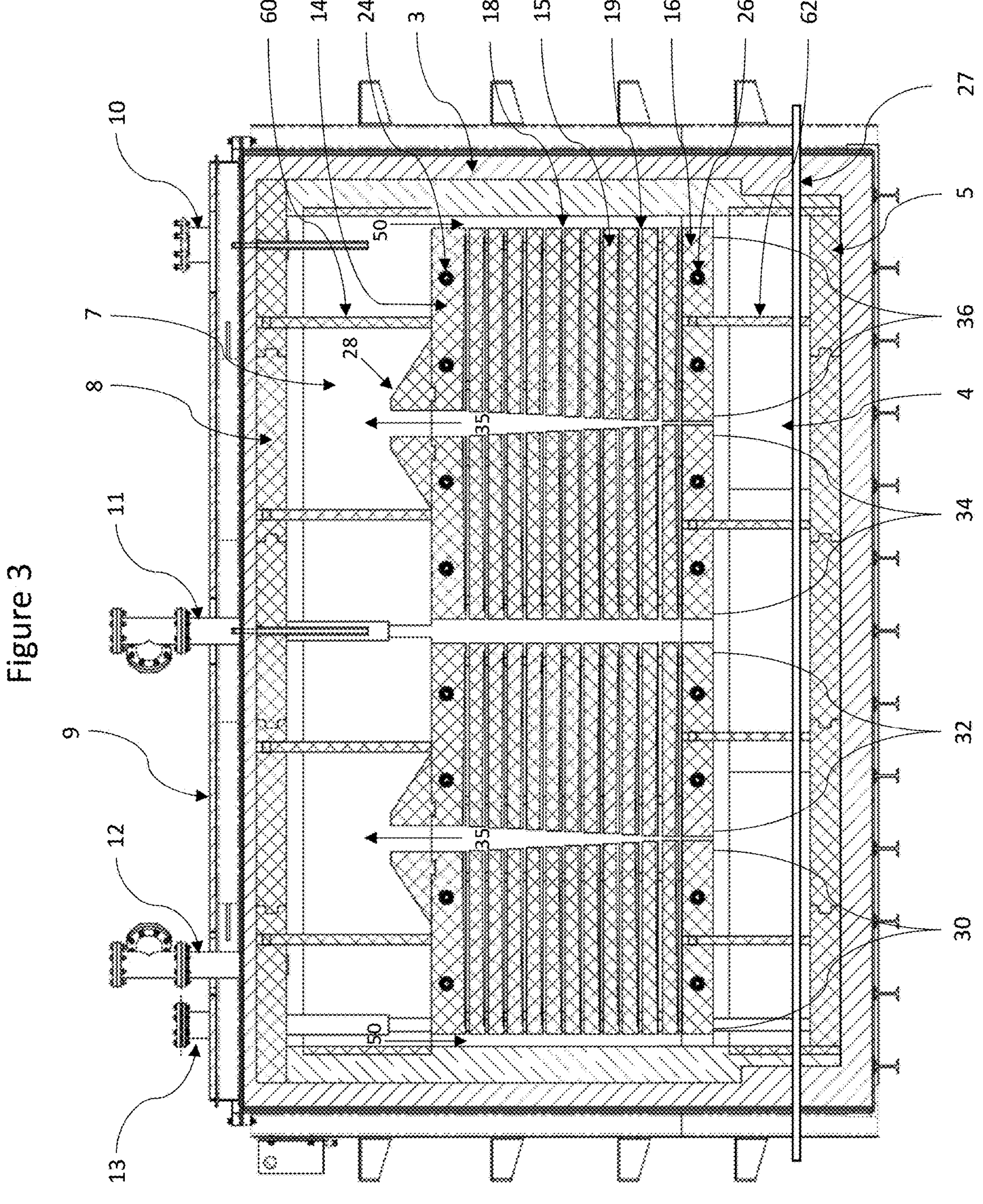
FIG. 3 is a side view of a reduction cell in accordance with certain aspects of the present invention.

A preferred cell structure for producing aluminum in accordance with the principles of the present invention is illustrated in the figures. Referring particularly to FIG. 3, the illustrated cell comprises an outer steel shell (not shown) which is lined with refractory sidewall and end wall brick 3, made of well-known thermally insulating, electrically non-conductive material which is resistant to molten aluminum chloride-containing chloride bath and the decomposition products thereof. The cell cavity accommodates a sump 4 in the lower portion for collecting the aluminum metal produced. The sump bottom 5 and walls are preferably made of graphite. The cell cavity also accommodates a bath reservoir 7 in its upper zone. The cell is enclosed by a refractory roof 8, and a lid 9. One or more tapping ports 10, extending through the lid 9 and roof 8, provides for insertion of a vacuum tapping tube, preferably constructed of quartz, down into sump 4, for removing molten aluminum. One or more feed ports 11 provide inlet means for feeding aluminum chloride into the bath. One or more offgas ports 12 provide outlet means for venting chlorine. Additional ports (not shown in FIG. 3) may be provided, including, but not limited to pressure relief ports and ports for the addition, removal, and/or circulation of the molten salt bath (discussed hereinbelow). Persons skilled in the art will appreciate that the numbers and locations of said ports can be located in various positions on the cell, with the positions shown in FIG. 3 being exemplary.

As shown in FIG. 3, within the cell cavity are four superimposed electrode stacks 30/32/34/36, each containing a plurality of plate-like electrodes which include an upper terminal anode 14 including dam 28 connected thereto, desirably an appreciable number of bipolar electrodes 15 (eleven being shown), and a lower terminal cathode 16, all preferably of graphite. These electrodes are arranged in superimposed relation, with each electrode being substantially horizontally disposed within a vertical stack. The cathode 16 is supported at each end on sump walls 6. The remaining electrodes are stacked one above the other in a spaced relationship established by interposed refractory pillars 18. Such pillars 18 are sized to closely space the electrodes, as for example to space them with their opposed surfaces separated by less than three-fourth inch. In the illustrated embodiment, twelve inter-electrode spaces 19 are formed between opposed electrodes-one between cathode 16 and the lowest of the bipolar electrodes 15, ten between successive pairs of intermediate bipolar electrodes 15, and one between the highest of the bipolar electrodes 15 and anode 14. Each inter-electrode space is bounded by an upper surface of one electrode (which functions as an anode surface) opposite a lower surface of another electrode (which functions as a cathode surface), and the spacing therebetween, e.g. about one-half inch, is referred to herein as the anode-cathode distance (the electrode to electrode distance being the effective anode-cathode distance in the absence of a metal layer of substantial thickness). The bath level in the cell will vary in operation but normally will lie well above the anode 14, thus filling all otherwise unoccupied space therebelow within the cell. Although a preferred cell structure is provided in FIG. 3, a person skilled in the art will appreciate that the number of superimposed electrode stacks, the number of bipolar electrodes, and the anode-cathode distance are design choices, and can be optimized based on economic, manufacturing, and spatial constraints.

A plurality of upper graphite heater rods 60 are connected to each anode 14, preferably eight heater rods 60 per electrode stack 30/32/34/36. Similarly, a plurality of lower graphite heater rods 62 are connected to each cathode 16, preferably eight heater rods 62 per electrode stack 30/32/34/36. In a preferred embodiment, heater rods 60 and 62 preferably utilize internal resistors to provide preheating of the cell during startup, preferably to 600° C.

Anode 14 has a plurality of copper electrode bars 24 inserted therein which serve as positive current leads, and cathode 16 has a plurality of copper collector bars 26 inserted therein which serve as negative current leads. The bars 24 and 26 extend through the cell wall and are suitably insulated from the steel shell 1. In a preferred embodiment of the present invention, bars 24 and 26 also serve as cooling elements for the cell, providing independent thermal control of each anode 14 and cathode 16. In one exemplary embodiment, bars 24 and 26 are preferably constructed of an outer copper pipe to make electrical and thermal contact with each anode 14 or cathode 16. An inner copper pipe with thermal conducting fins is used to conduct cooling air through the length of bars 24 and 26 and effect adequate thermal transfer between the cooling air and the copper bar. The flow of cooling air is preferably provided by an external fan and controlled to maintain the heat balance in the cell.

As noted earlier, the sump 4 is adapted to contain bath and molten aluminum, and the latter may accumulate beneath the bath in the sump, during operation. Should it be desired to separately heat the bath and any metal in sump 4, an auxiliary heating circuit may be established therein.

Rows of immersion heater rods 27 are preferably placed at bottom of the cell to maintain heat balance in cell during cell hibernation or at times of reduced power.

With reference now to FIG. 3, the bath flow passages will now be described. Bath supply passages 50 generally extend from the upper reservoir 7 down along one side (as viewed in FIG. 3) of each of the superimposed electrode stacks 30/32/34/36, and such passage has fluid communication with each inter-electrode space 19, and desirably with the sump 4. This bath supply passage is compositely defined by a series of selectively sized and shaped openings in the sides of the electrodes.

With respect to electrode stack 36, the general movement of bath will be downwardly from the right side of anode 14, as seen in FIG. 3, through a relatively wide opening in the edge of the anode 14, thus passing into the space on the right hand side of the uppermost inter-electrode space 19. The bath flows downwardly through the bath supply passage openings on the right hand side of the next electrode to the right hand side of the next inter-electrode space 19, and so on. A portion of such bath may also flow through the opening on the right hand side of the cathode 16 into and through the sump 4.

Similarly, with respect to electrode stack 34, the general movement of bath will be downwardly from the left side of anode 14, as seen in FIG. 3, through a relatively wide opening in the edge of the anode 14, thus passing into the space on the left hand side of the uppermost inter-electrode space 19. The bath flows downwardly through the bath supply passage openings on the left hand side of the next electrode to the left hand side of the next inter-electrode space 19, and so on. A portion of such bath may also flow through the opening on the left hand side of the cathode 16 into and through the sump 4.

Similarly, with respect to electrode stack 32, the general movement of bath will be downwardly from the right side of anode 14, as seen in FIG. 3, through a relatively wide opening in the edge of the anode 14, thus passing into the space on the right hand side of the uppermost inter-electrode space 19. The bath flows downwardly through the bath supply passage openings on the right hand side of the next electrode to the right hand side of the next interelectrode space 19, and so on. A portion of such bath may also flow through the opening on the right hand side of the cathode 16 into and through the sump 4.

Similarly, with respect to electrode stack 30, the general movement of bath will be downwardly from the left side of anode 14, as seen in FIG. 3, through a relatively wide opening in the edge of the anode 14, thus passing into the space on the left hand side of the uppermost inter-electrode space 19. The bath flows downwardly through the bath supply passage openings on the left hand side of the next electrode to the left hand side of the next interelectrode space 19, and so on. A portion of such bath may also flow through the opening on the left hand side of the cathode 16 into and through the sump 4.

Figure 4:
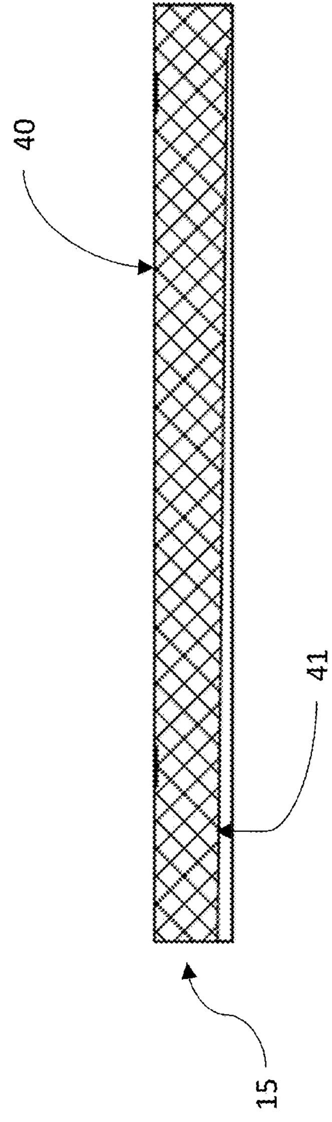
FIG. 4 is a side view of an electrode in accordance with certain aspects of the present invention.

Slots 41 (as shown in FIG. 4) are desirably in the horizontal or near horizontal downward facing anode surfaces where the chlorine gas product is generated by electrolysis. The width, depth, spacing and direction of the slots facilitate the venting of the anodically produced chlorine gas from the lower surface of the anode 15 and the anode-cathode distance (ACD) gap between the anode surface and its opposing cathode surface. The slot direction is such to enhance the bath flow through the ACD gap. The slot width and spacing are such to minimize the chloride gas accumulation on the anode surface which increases the working anode current density and voltage loss in the bath and anodic concentration polarization voltage losses. The slot depth may vary to accommodate the accumulation of the chlorine gas in the gas venting slot and to promote the gas flow in the same direction as the bath in the ACD. The slot depth may be zero at the side of the anode to minimize any gas back flow into the downcomer channel along the right side of anode 14, as seen in FIG. 3. Further, the loss of cell current efficiency may be minimized by venting of the anodically produced chlorine gas from the lower surface of the anode 15 from back reacting with the cathodically produced aluminum metal in the ACD gap between the anode surface and its opposing cathode surface and aluminum metal located on the upward looking cathode surface 40.

The upward looking cathode surface 40 (as shown in FIG. 4) may be coated with or contain 5-100 wt % aluminum wettable material such as $TiB_2$ or similar wetting material to promote the drainage of the aluminum metal from the cathode surface and minimize any dispersion of aluminum metal into the flowing ACD bath. A sloping cathode surface may be employed to enhance the cell current efficiency by promoting the metal drainage flow in into the downcomer channel along the right side of anode 14, as seen in FIG. 3.

In a similar manner, a bath return passage 35 provides for the upward transport of the bath material to the reservoir 7 after passage thereof through the inter-electrode spaces 19, the flow being induced as described hereinafter by the gas lift pump effect of the chlorine gas internally produced by electrolysis in the inter-electrode spaces 19. The bath return passages 35 generally extends upwardly between adjacent electrode stacks 30/32 and 34/36, and specifically through dams 28 associated with adjacent electrode stacks into reservoir 7, as shown in FIG. 3. Dams 28 are provided to improve the uniformity of the upcoming bath material flow. As an example, bath return passage 35 extends upwardly along the left hand side of each inter-electrode space 19 of electrode stack 36 (i.e., opposite the supply passage 50 for electrode stack 36), and extends upwardly along the right hand side of each inter-electrode space 19 of electrode stack 34 (i.e., opposite the supply passage 50 for electrode stack 34). In this manner, bath return passage 35 has fluid communication with each inter-electrode space 19 of electrode stacks 34 and 36, and desirably also communicates with sump 4. Bath return passage 35 is compositely defined by selectively sized and shaped openings at the sides of the electrodes, with a relatively wide opening in the edge of anode 14, and decreasing opening size in the successively lower electrodes, and narrowest in the lowest bipolar electrode 15. FIG. 3 schematically shows a preferred size gradation of such openings. Thus the bath return, gas lift passage desirably has an upward size increase, i.e., it is preferably larger at the uppermost bipolar electrode levels than at the lowermost bipolar electrode levels and is generally increased in size from lower to higher levels to accommodate additional chlorine and bath flowing thereinto from successive inter-electrode spaces.

The selective flow of gas and bath across each inter-electrode space 19 is selectively directed by the configuration of its upper or anode surface, a preferred configuration being illustrated in FIG. 4 with respect to right-to-left bath flow in electrode stacks 32/36 (a person skilled in the art will appreciate that FIG. 4 would be mirrored with respect to left-to-right bath flow in electrode stacks 30/34). Each bipolar electrode 15 has a substantially horizontal cathode surface 40, as does cathode 16, which functions as the lower bounding surface of an inter-electrode space 19. Each bipolar electrode 15 also has a transversely channeled anode surface 41, as does anode 14, which functions as the upper bounding surface of an inter-electrode space 19. Channeled anode surface 41 operates to conduct chlorine upwardly away from anode surface 41 and thereby effect removal of chlorine from a location within the minimum anode-cathode space to a location further from the aluminum produced on the cathode surface, with a concomitant minimizing of re-chlorination of the aluminum produced.

The electrolyte employed for producing aluminum in accordance with the subject invention normally will comprise a molten bath composed essentially of aluminum chloride dissolved in one or more metal chloride salts of higher decomposition potential than aluminum chloride. By electrolysis of such a bath, chlorine is produced on the anode surfaces and aluminum on the cathode surfaces of the cell electrodes. The aluminum is conveniently separated by settling from the lighter bath, and the chlorine rises to be vented from the cell. In such practice of the subject invention, the molten bath is positively circulated through the cell by the buoyant gas lift effect of the internally produced chlorine gas, and aluminum chloride is periodically or continuously introduced into the bath to maintain the desired aluminum chloride concentration.

The bath composition, in addition to the dissolved aluminum chloride, will usually be made up of alkali metal chlorides, although, other alkali metal chlorides and alkaline earth halides, may also be employed. A presently preferred composition comprises an alkali metal chloride base composition made up of about 50-75% by weight sodium chloride and 25-50% lithium chloride, preferably 60% by weight sodium chloride and 40% by weight lithium chloride. Aluminum chloride is dissolved in such halide composition to provide a bath from which aluminum may be produced by electrolysis, and an aluminum chloride content of about 1 to 10%, preferably 3-6%, by weight of the bath will generally be desirable. The bath is employed in molten condition, usually at a temperature above that of molten aluminum and in the range between 600° C. and 800° C., preferably between 660° C. and 730° C., and most preferably at about 700° C.

Figure 2:
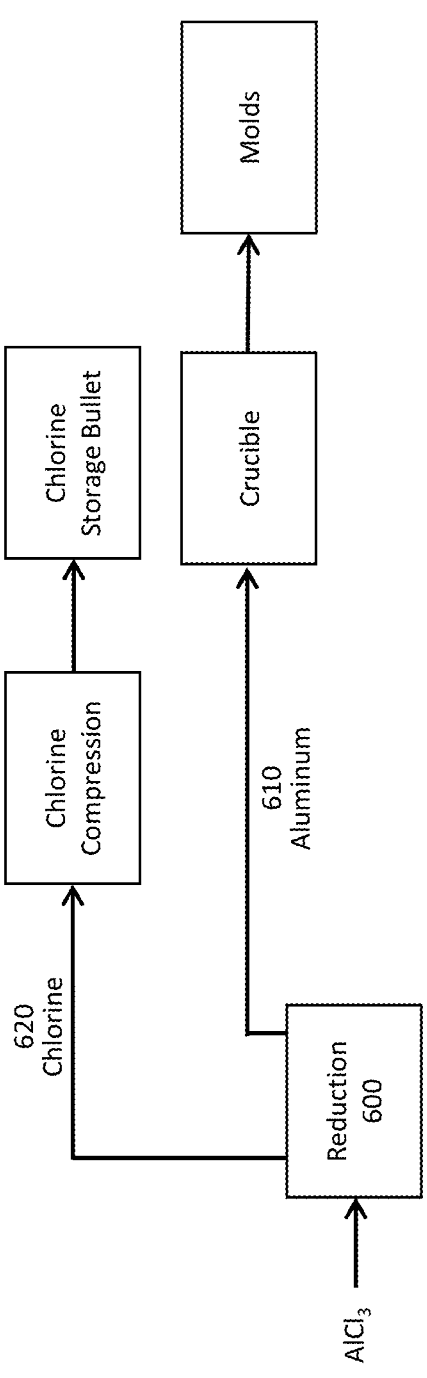
FIG. 2 is a block diagram illustrating the production of aluminum from an alumina-containing feedstock.

The process for producing metal from metal chloride is exemplified by the process illustrated in FIG. 2 and described in the following detailed description of preferred modes of operation as employed for producing aluminum in the bipolar electrode cell of FIG. 3, it being understood that references to exemplary cell structure shown in the drawings should be taken as illustrative only. As described hereinabove, bath supplied from reservoir 7 through bath supply passage 30 is electrolyzed in each interelectrode space 19 in a cell which includes, in superimposed, spaced relationship, an upper anode 14, at least one intermediate bipolar electrode 15, and a lower cathode 16, to produce chlorine on each anode surface 41 thereof, and aluminum on each cathode surface 40 thereof.

The electrode current density may conveniently range from about 5 to about 20 amperes per square inch, the practical operating current density suited to any particular cell structure being readily determined by observation of the operating conditions. The chlorine so produced is buoyant and its movement is employed to effect bath circulation, while aluminum is swept by the moving bath from the cathode surfaces and settles from the outflowing bath in a manner to be described hereinbelow. An induced flow of molten bath into, through, and out of each inter-electrode space 19 is established which sweeps aluminum produced on each cathode surface 40 through and out of each inter-electrode space 19 in a direction concurrent with the flow of the bath. This sweeping action effectively prevents aluminum from coalescing in unduly large droplets or from building up into a substantial pool or layer thickness on the cathode surfaces, and the bath flow through each inter-electrode space may be maintained at a rate such that there is no substantial accumulation of aluminum therein. In any given installation, the practical velocity suited to any particular cell structure and anode-cathode spacing will be determined by observation of the operating conditions.

In accordance with certain aspects of the present invention described above, the above-described processes can be utilized as follows: 135-350 kg/hr of calcined kaolin clay can be chlorinated with 100-300 kg/hr of chlorine and 25-70 kg/hr of calcined coke to yield 105-300 kg/hr of pure $AlCl_3$, from which 20-60 kg/hr of pure aluminum can be recovered. Total plant power consumption is estimated to be 6-17 MWHr. Persons skilled in the art will appreciate that these values vary based on varied alumina content within a given feedstock, in a predictable manner using the teachings of the present invention.

The molten bath exiting from each inter-electrode space 19 is effectively and positively pumped upwardly in the return passage 35, preferably by employment of the gas lift effect thereon of chlorine produced and conducted from each inter-electrode space in the same general direction as the bath and buoyantly rising in the return passage 35. This, in turn, induces the selectively directed, concomitant flow of bath through the interelectrode spaces. Preferably, the bath which is upwardly moving in the return passage 35 is delivered to the reservoir 7 above the anode 14, where the chlorine may be conveniently vented from the bath at port 12 and the aluminum chloride content of the bath may be replenished through port 11.

As discussed previously, channeled anode surface 41 accommodates the outward flow of chlorine produced without accumulation of a substantial amount of such chlorine on the lowermost anode surfaces 41, and also unidirectionally directs the flow of chlorine in a substantially unobstructed manner, minimizing or preventing back flow toward the supply passage 30.

Off-gas from the reduction cell contains a mixture of $Cl_2$, $AlCl_3$, evaporated bath vapor, $N_2$ and a mist of the operating bath. A primary cooler cools the gas/mist to approximately 280° C. in a shell-and-tube heat exchanger, using diphenyl-diphenyl oxide (DP:DPO) eutectic heat-transfer fluids as coolant, for example. The cooling temperature is selected to minimize the formation of solids on the cooler walls and in the condensed liquid. The liquids and solids condensed in this cooler are separated out of the gas stream in a demister unit and then recycled by gravity back into the reduction cell. The off-gas stream is then cooled to approximately 30° C. to condense and solidify the remaining salts for removal in a cell gas filter. Preferably liquid $Cl_2$ is then injected into the off-gas stream to cool it while avoiding solid accumulation on any solid cooling walls. The filtered $Cl_2$ gas is then dried and re-filtered. A portion of the dry $Cl_2$ gas is compressed and recycled for use directly in the chlorination process. The remaining portion of the dry $Cl_2$ gas is liquefied in multistage compression with intercoolers, preferably cooled using cooling tower water. Preferably a portion of the liquid $Cl_2$ is used as the coolant for cooling the $Cl_2$ gas discharged from the demister described above. The remaining liquid $Cl_2$ is stored in a storage bullet at 19 barg, with liquid chlorine delivered to the site via truck or railcar.

While the bath is being upwardly displaced in the gas lift passage 35 as described above, aluminum swept thereinto from each inter-electrode space 19 is permitted to settle in a counter current direction therein, without undue re-chlorination of aluminum so produced, although some aluminum may be carried upwardly with the bath to be recirculated with the bath. The settling aluminum accumulates in a sump 4 below cathode 16, from which it may be tapped as desired. Circulating chlorine within the cell reacts with the aluminum to remove any Na or Li co-deposited into the aluminum metal and purge any gasses dissolved in the aluminum metal. One practical method of removing molten aluminum is to use a vacuum tapping tube, preferably made of quartz, inserted into sump 4 through port 10 and the bath supply passage 30. Molten aluminum product is then transferred into a crucible for transfer to casting into molds. Aluminum produced according to the teachings of the present invention can achieve purities greater than 99.9%, preferably greater than 99.99%, and most preferably greater than 99.999%.

It will be observed from the foregoing description, the present invention provides both a process and apparatus for producing aluminum from aluminum chloride. The present invention may also be employed for producing other metals and alloys. As a first example, the cell and process described in detail herein may be employed to produce magnesium. In such case the bath may be composed of magnesium chloride dissolved in molten halide of higher decomposition potential. From such a bath, magnesium metal is produced in the manner generally described with reference to producing aluminum. If a small amount of aluminum chloride is also present, the magnesium produced may also contain some aluminum. As a second example, if $SiCl_4$ is added to the bath during aluminum production, a Si—Al alloy is produced directly in the cell, as opposed to a traditional alloying process during casting.

C. Sludge and Impurity Control in the Reduction Cell

In yet another embodiment of the present invention is a commercially viable process to minimize or eliminate sludge formation in the reduction cell of the present invention or the Alcoa Smelting Process (ASP) reduction cell of the prior art, which persons skilled in the art will understand limits its useful operation and economic operation life. Accumulated sludge on the upward looking cathode surfaces and in the anode-cathode distance (ACD) gap could, amongst other things, disrupt the flow of metal product from the cathode surface, reduce the bath flow through the ACD, increase the electrolysis voltage drop in the cell, create an electrolysis short circuit by the carbon in the sludge, and reduce the metal storage capacity in the metal sump thereby increasing the required cell tapping frequency.

Persons skilled in the art will appreciate that sludge formation in a reduction cell is a result of numerous factors, including, but not limited to:

(1) particulate contamination in the $AlCl_3$ feed material;
(2) carbon contamination resulting from a shift in the Boudouard Equilibrium ($2\ CO \leftrightarrow CO_2 + C$) when $AlCl_3$ is cooled in the presence of $CO/CO_2$ off gas from the chlorinator;
(3) erosion of carbon surfaces in the cell;
(4) intrusion of air and/or moisture, which reacts with the bath $AlCl_3$ to form insoluble $Al_2O_3$ particles; and
(5) particulate impurities in the bath make-up process used to maintain the bath NaCl/LiCl mole ratio and the bath volume in the cell.

This present invention provides several methods for preventing sludge formation, specifically:

(1) a chlorinator off gas purification and filtration system as previously described to minimize the impurity and particulate contamination in the high purity $AlCl_3$ feed material for the cell;
(2) a dry high purity blanket/purge cover for the feed materials and cell bath;
(3) a disposable filter to remove particle contaminants in the make-up bath production and transfer process;
(4) a disposable filter to remove particle contaminants in the recycled liquid bath salts removed from the cell bath evaporation and mist entrainment in the cell off-gas. This filtered liquid is returned directly back into the cell to minimize bath losses.

The room temperature solid bath materials removed in the final cell $Cl_2$ off-gas purification consists of a mixture of NaCl, LiCl, $AlCl_3$ and traces of other salt impurities such as $KAlCl_4$ that may have accumulated in the cell bath. Preferably the cell filter residue is blended with the pure $AlCl_3$ used to feed the cell to minimize the loss of the NaCl, LiCl and $AlCl_3$ salts. However, if bath analysis identifies there is a slow accumulation of any impurity salts in the bath, this invention adds the cell filter residue to the gas discharge of the external cyclone filter in the chlorinator off-gas purification process. This addition point helps cool the chlorinator off-gas and removes contaminates to prevent their build up in the cell bath such as $KAlCl_4$.

As such, persons skilled in the art will appreciate that the present invention provides a set of process steps that can be used together or separately to maintain the cell bath chemistry, minimize sludge formation in the cell and avoid the accumulation of any unwanted impurities in the cell reduction process.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings therein. It is therefore evident that the particular embodiments disclosed above may be altered or modified and all such variations are considered within the scope and sprit of the present invention.

The invention claimed is:

1. A method for producing a Si—Al alloy by the electrolytic reduction of aluminum chloride, comprising:

providing a cell comprising:
- a plurality of electrode stacks arranged in pairs, wherein each electrode stack comprises:
  - an upper terminal anode;
  - a lower terminal cathode; and
  - one or more intermediate bipolar electrodes disposed between the upper terminal anode and the lower terminal cathode in a superimposed, vertically spaced relationship defining inter-electrode spaces;
- a plurality of bath supply passages extending downwardly along one side of each electrode stack, and in fluid communication with: (a) a bath reservoir located above the plurality of upper terminal anodes; (b) each inter-electrode space for that stack; and (c) a molten alloy product sump located below the plurality of lower terminal cathodes; and
- a plurality of bath return passages extending upwardly between each of the paired electrode stacks, and in fluid communication with: (a) each inter-electrode space for both of the paired electrode stacks; (b) the bath reservoir, and (c) the aluminum product sump;

adding aluminum chloride and $SiCl_4$ into the bath reservoir using one or more feed ports;

controlling the electrode current density to maintain the desired circulation rate of a chloride bath within the cell;

removing a chlorine gas stream from the bath reservoir using one or more offgas ports; and removing a molten Si—Al alloy from the molten alloy product sump using one or more tapping ports.

2. The method of claim 1, wherein the cell further comprises one or more electrode bars in electrical and thermal contact with each upper terminal anode, wherein the one or more electrode bars functions as positive current leads and to provide independent thermal control to the upper terminal anode.

3. The method of claim 2, wherein the one or more electrode bars each comprise an outer conductive pipe and an inner conductive pipe with thermal conducting fins for providing thermal transfer between a cooling medium and the upper terminal anode.

4. The method of claim 1, wherein the cell further comprises one or more electrode bars in electrical and thermal contact with each low terminal cathode, wherein the one or more electrode bars functions as negative current leads and to provide independent thermal control to the lower terminal cathode.

5. The method of claim 4, wherein the one or more electrode bars each comprise an outer conductive pipe and an inner conductive pipe with thermal conducting fins for providing thermal transfer between a cooling medium and the lower terminal cathode.

6. The method of claim 1, wherein the chloride bath comprises dissolved aluminum chloride in the range of about 1% to about 10%, by weight.

7. The method of claim 1, wherein the chloride bath composition comprises sodium chloride in the range of from about 50% to about 75%, and lithium chloride in the range of from about 25% to about 50%, by weight, exclusive of dissolved aluminum chloride.

8. The method of claim 1, further comprising separating and recycling a portion of the chlorine gas stream back to the cell.

9. The method of claim 1, wherein the removing a molten Si—Al alloy step utilizes a vacuum to transfer a portion of the molten Si—Al alloy from the one or more tapping ports to an external metal transfer vessel for transport to a metal casting facility.

* * * * *